United States Patent
Anandan et al.

(10) Patent No.: US 10,050,303 B2
(45) Date of Patent: Aug. 14, 2018

(54) BATTERIES INCLUDING SOLID AND LIQUID ELECTROLYTE

(71) Applicant: FORD GLOBAL TECHNOLOGIES, LLC, Dearborn, MI (US)

(72) Inventors: Venkataramani Anandan, Farmington Hills, MI (US); Andrew Robert Drews, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 77 days.

(21) Appl. No.: 15/066,362

(22) Filed: Mar. 10, 2016

(65) Prior Publication Data

US 2017/0263975 A1    Sep. 14, 2017

(51) Int. Cl.
*H01M 6/14* (2006.01)
*H01M 10/0562* (2010.01)
*H01M 10/0525* (2010.01)
*H01M 10/0568* (2010.01)
*H01M 4/13* (2010.01)
*H01M 2/16* (2006.01)

(52) U.S. Cl.
CPC ......... *H01M 10/0562* (2013.01); *H01M 2/16* (2013.01); *H01M 4/13* (2013.01); *H01M 10/0525* (2013.01); *H01M 10/0568* (2013.01)

(58) Field of Classification Search
CPC ......... H01M 10/0562; H01M 10/0525; H01M 10/0568; H01M 4/13; H01M 2/16
See application file for complete search history.

(56) References Cited

U.S. PATENT DOCUMENTS

| 8,735,003 B2 | 5/2014 | Kim et al. |
| 9,099,694 B2 | 8/2015 | Suyama et al. |
| 2014/0302370 A1* | 10/2014 | Woodford ............. H01M 8/188 429/101 |
| 2014/0302399 A1 | 10/2014 | Saimen et al. |
| 2014/0308571 A1* | 10/2014 | Gaben ............... H01M 10/0562 429/162 |

FOREIGN PATENT DOCUMENTS

WO    2014/176266 A1    10/2014

\* cited by examiner

*Primary Examiner* — Jane Rhee
(74) *Attorney, Agent, or Firm* — James Dottavio; Brooks Kushman P.C.

(57) ABSTRACT

Rechargeable batteries (e.g., Li-ion) including hybrid liquid and solid electrolytes are disclosed. One embodiment of a battery may include an anode; a cathode; an ionically-conductive separator between the anode and cathode; and an electrolyte suspension including a plurality of solid electrolyte particles dispersed in a liquid electrolyte solution. The solid electrolyte particles may have an average size of up to 1 μm or 100 nm and the particles may comprise 5 to 95% by volume of the electrolyte suspension. In another embodiment, a plurality of solid electrolyte particles may be dispersed and embedded within a bulk of at least one of the anode, cathode or separator. In some embodiments, there may be a plurality of solid electrolyte particles in both suspension and embedded in the battery component(s). Replacing some of the liquid electrolyte with solid electrolyte may reduce the flammability of the electrolyte.

18 Claims, 2 Drawing Sheets

US 10,050,303 B2

BATTERIES INCLUDING SOLID AND LIQUID ELECTROLYTE

TECHNICAL FIELD

The present disclosure relates to rechargeable batteries, for example, lithium-ion batteries including solid and liquid electrolytes.

BACKGROUND

Lithium-ion (Li-ion) batteries have become commonly used in many applications. In automotive applications, they may be used in hybrid, plug-in hybrid, and all-electric vehicles. However, Li-ion batteries are also used in many other applications, such as portable electronics (e.g., cell phones). These batteries may generally include organic liquid electrolytes, which may be based on alkyl carbonates. Liquid electrolytes may generally have a wide electrochemical window, good ionic conductivity and chemical stability. However, these electrolytes may also be volatile and flammable, which may pose safety issues in certain conditions.

SUMMARY

In at least one embodiment, a lithium-ion battery is provided. The battery may include an anode; a cathode; an ionically-conductive separator between the anode and cathode; and an electrolyte suspension including a plurality of solid electrolyte particles dispersed in a liquid electrolyte solution.

In one embodiment, the electrolyte suspension includes from 5 to 95 vol. % solid electrolyte particles. In another embodiment, the electrolyte suspension includes from 20 to 95 vol. % solid electrolyte particles. The plurality of solid electrolyte particles may have an average particle size of up to 1 µm or up to 100 nm. In one embodiment, the plurality of solid electrolyte particles includes one or more of lithium lanthanum zirconium oxide (LLZO), lithium lanthanum titanates (LLTO), NASICON type electrolytes, LISICON type electrolytes, or thio-LISICON type electrolytes. In another embodiment, the plurality of solid electrolyte particles includes one or more of sulfide glass type electrolytes or lithium phosphorous oxynitride (LIPON) type electrolytes. The liquid electrolyte solution may include an organic solvent and a lithium salt.

In at least one embodiment, a rechargeable battery is provided. The battery may include an anode; a cathode; an ionically-conductive separator between the anode and cathode; and a plurality of solid electrolyte particles dispersed and embedded within a bulk of at least one of the anode or cathode.

In one embodiment, at least a portion of the plurality of solid electrolyte particles is arranged in an interconnected three-dimensional network. The plurality of solid electrolyte particles may have an average particle size of up to 5 µm. A plurality of solid electrolyte particles may be dispersed and embedded within a bulk of the anode and the cathode. In one embodiment, the plurality of solid electrolyte particles dispersed and embedded within the bulk of at least one of the anode or cathode is a first plurality of solid electrolyte particles, and a second plurality of solid electrolyte particles is dispersed and embedded within a bulk of the ionically-conductive separator. The first and second plurality of solid electrolyte particles may have a same size and/or composition. In one embodiment, an average particle size of the plurality of solid electrolyte particles may increase from one side of the anode or cathode to an opposite side.

In at least one embodiment, a rechargeable battery is provided. The battery may include an anode; a cathode; an ionically-conductive separator between the anode and cathode; an electrolyte suspension including a first plurality of solid electrolyte particles dispersed in a liquid electrolyte solution; and a second plurality of solid electrolyte particles dispersed and embedded within a bulk of at least one of the anode, the cathode, or the separator.

In one embodiment, the first and the second plurality of solid electrolyte particles have a different size and/or composition. The battery may have a volume ratio of solid electrolyte particles to liquid electrolyte may be at least 1:4 or at least 1:2. In one embodiment, each of the anode, the cathode, and the separator have a plurality of solid electrolyte particles dispersed and embedded within a bulk thereof.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Under some extreme conditions, such as unusual voltage and temperature, Li-ion battery electrolytes can react with the active electrode materials to release heat and gas. If the pressure inside the cell becomes too high, the gases may vent into the surrounding environment and potentially form a fuel-air mixture. The fuel-air mixture could be ignited by a spark or from the heat generated by the reaction between the electrolyte and the electrode materials. To address these potential issues, additives may be added to the electrolyte, such as flame retardants to reduce flammability. However, these additives may be costly and can significantly reduce the cell performance. In addition, some additives may not be chemically stable with active materials and may not function under some circumstances.

Figure 1:
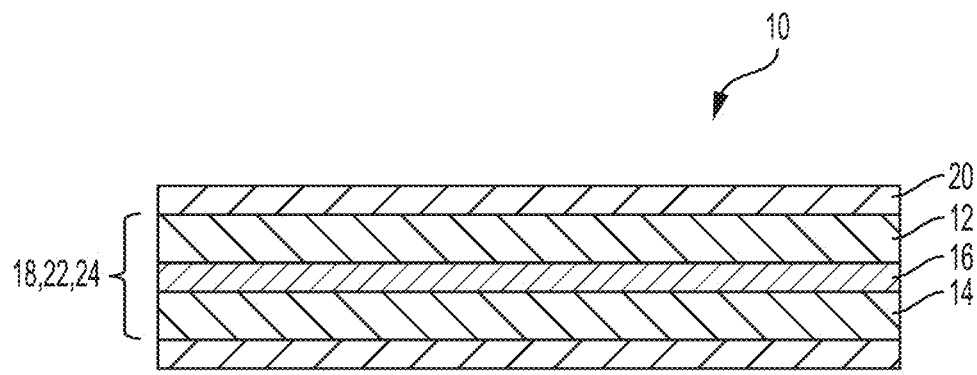
FIG. 1 is a schematic cross-section of a rechargeable battery (e.g., Li-ion), according to an embodiment.

With reference to FIG. 1, a battery 10 is shown, which may be a secondary or rechargeable battery (e.g., a lithium-ion battery). The battery 10 includes a negative electrode (anode) 12, a positive electrode (cathode) 14, a separator 16, and an electrolyte 18 disposed within the electrodes 12, 14 and separator 16. However, the battery 10 may include additional components or may not require all the components shown, depending on the battery type or configuration. In addition, a current collector 20 may be disposed on one or both of the anode 12 and cathode 14. In at least one embodiment, the current collector 20 is a metal or metal foil. In one embodiment, an anode current collector 20 is formed of copper, while a cathode current collector is formed of aluminum. Examples of other suitable metal foils may include, but are not limited to, stainless steel, nickel, gold, or titanium.

In one embodiment, the anode 12 may include an active material comprising a carbonaceous material, such as graphite (natural, artificial, or surface-modified natural), hard carbon, soft carbon, or Si/Sn-enriched graphite. Non-carbonaceous active materials may also be used, such as lithium titanate oxide (LTO), silicon and silicon composites, lithium metal, and nickel oxide (NiO). In another embodiment, the cathode 14 may include an active material comprising lithium nickel cobalt aluminum oxide (NCA), lithium nickel manganese cobalt oxide (NMC), lithium manganese spinel oxide (Mn Spinel or LMO), lithium iron phosphate (LFP) and its derivatives lithium mixed metal phosphate (LFMP), sulfur or sulfur-based materials (e.g., sulfur-carbon composites) or carbon based cathodes (e.g., in Li-air batteries). In addition, mixtures of any of two or more of these materials may be used. These electrode active materials are merely examples, however, and any electrode materials known in the art may be used. The separator 16 may be formed of any suitable ionically conductive, electrically insulating material. In one embodiment, the separator 16 may be a polymer separator, for example, a polyolefin separator (e.g., polyethylene or polypropylene).

Electrode production may include casting slurry onto a current collector 20 and drying the slurry to form an electrode (e.g., anode 12 and/or cathode 14). The slurry may include active material, electrically conductive material, binder, and/or solvent. The composite slurry may be spread evenly onto the current collector 20 during casting to facilitate a uniform electrode. The electrically conductive material in the electrode may include carbon. If the anode active material is a carbonaceous material, the electrically conductive material may be excluded. The carbon may be in any suitable form, such as graphite, carbon black, graphene, carbon nanotubes, or others, or a combination thereof. Non-limiting examples of binders that may be used in the electrodes include carboxymethylcellulose (CMC), poly(vinylidene fluoride) (PVDF) binders, poly(acrylic acid) (PAA), polyacrylonitrile (PAN), polytetrafluoroethylene (PTFE, e.g., Teflon), styrene-butadiene rubber/carboxymethylcellulose (SBR/CMC), or others.

The electrolyte 18 may include a liquid electrolyte 22, which may include a lithium salt and an organic solvent. Examples of lithium salts may include $LiPF_6$, $LiBF_4$ or $LiClO_4$. Suitable organic solvents may include ethylene carbonate (EC), dimethyl carbonate (DMC), ethyl methyl carbonate (EMC), diethyl carbonate (DEC), or mixtures thereof. However, any suitable lithium salt and organic solvent combination may be used. As disclosed above, under extreme circumstances, these liquid electrolytes may react with the active electrode materials to release heat and gas. This reaction may, in turn, lead to a chain of reactions that could lead to a fire.

It has been discovered that a combination of solid and liquid electrolyte may decrease the flammability of the electrolyte. In some situations, this could improve the safety margin of a Li-ion battery. In some embodiments, the partial substitution of liquid electrolyte with a solid electrolyte may be realized without sacrificing cell performance to a substantial degree. In at least one embodiment, the electrolyte 18 may include a suspension of solid electrolyte particles 24 in a liquid electrolyte 22. The liquid electrolyte 22 is described above and may include, for example, a lithium salt and an organic solvent. The solid electrolyte particles 24 may be formed of any suitable solid electrolyte material (e.g., as solid material that allows the movement of ions via hopping/jumping through a crystal structure). Non-limiting examples of solid electrolyte materials that may be included in the solid electrolyte particles 24 may include crystalline electrolytes such as lithium lanthanum zirconium oxide (LLZO), lithium lanthanum titanates (LLTO), NASICON type electrolytes (LATP), LISICON type electrolytes ($Li_{14}ZnGe_4O_{16}$), or thio-LISICON ($Li_{10}SnP_2S_{12}$, $Li_{10}GeP_2S_{12}$). Amorphous type electrolytes may include sulfide glass electrolytes ($Li_2S$—$SiS_2$) or lithium phosphorous oxynitride (LIPON).

By replacing a portion of the liquid electrolyte (mass and/or volume) with a solid electrolyte, there may be less liquid electrolyte to react and potentially cause safety issues. Solid electrolytes generally have lower ionic conductivity than liquid electrolytes, which is one reason that liquid electrolytes are currently favored. However, the disclosed results suggest that replacing a portion of the liquid electrolyte with a solid electrolyte may not significantly compromise cell performance.

The solid electrolyte (SE) particles 24 may have a particle size that reduces or prevents sedimentation of the particles 24 in the electrolyte 18 suspension. In one embodiment, the SE particles 24 may have an average or mean particle size of at most 5 μm, for example, at most 3 μm, or at most 1 μm. In another embodiment, the SE particles 24 may have an average or mean particle size of at most 500 nm, at most 300 nm, at most 200 nm, at most 100 nm, or at most 50 nm. For example, the SE particles 24 may have an average particle size of 1 to 1,000 nm (1 μm), or any sub-range therein, such as 1 to 750 nm, 1 to 500 nm, 1 to 250 nm, 1 to 100 nm, 1 to 75 nm, 1 to 50 nm, or 1 to 25 nm. In some embodiments, smaller particles may be favored because of their higher relative surface area, while in others, larger particles may be favored because of their bulk ionic conduction, or as a means to reduce interfacial resistance between particles. The particle size may therefore depend on other conditions or properties of the battery design.

The composition of the electrolyte 18 suspension may vary depending on the battery performance and safety margin desired. In general, the flammability of the electrolyte may be decreased by increasing the amount of SE particles 24 relative to the liquid electrolyte 22. The battery performance may vary depending on the liquid and solid electrolyte materials. In one embodiment, the electrolyte 18 may include from 5 to 95 vol. % of the SE particles 24, or any sub-range therein. For example, the electrolyte 18 may include from 5 to 95 vol. %, 10 to 95 vol. %, 20 to 95 vol. %, 30 to 95 vol. %, 40 to 95 vol. %, 50 to 95 vol. %, 60 to 95 vol. %, 70 to 95 vol. %, 20 to 75 vol. %, 25 to 50 vol. %, or 30 to 75 vol. % of the SE particles 24. The balance of the electrolyte 18 may be liquid electrolyte.

The disclosed hybrid liquid and solid electrolyte may be prepared before adding it to the battery cell in a filling operation. The solid electrolyte particles 24 may be dispersed into the liquid electrolyte 22 to form a slurry or suspension. As described above, to avoid sedimentation of the solid particles in the hybrid electrolyte system, the average particle size may be below a certain size, such as less than 1 μm or less than 100 nm. In addition, additives such as stabilizers and/or surfactants may be added to the electrolyte to improve the stability of the suspension and/or the ionic coupling between the two phases. The prepared hybrid electrolyte may be added to the cell assembly prior to a cell sealing operation.

Figure 2:
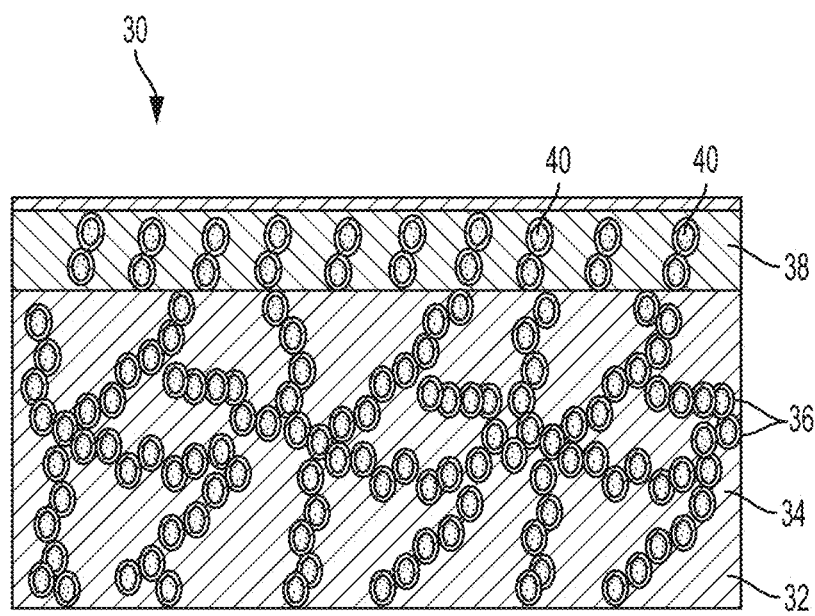
FIG. 2 is a schematic cross-section of an electrode and a separator of a rechargeable battery (e.g., Li-ion), according to an embodiment.

With reference to FIG. 2, another embodiment of a battery 30 is shown, which may be a secondary or rechargeable battery (e.g., a lithium-ion battery). A simplified schematic of an electrode 32 and a separator 38 are shown in FIG. 2, however, the battery 30 may include the other components of battery 10, as well. The electrode 32 may be an anode or a cathode. In some embodiments, both the anode and the cathode of the battery 30 may have the disclosed structure.

Similar to above, the battery 30 may include both liquid electrolyte 34 and solid electrolyte particles 36. However, in at least one embodiment, the electrode 32 of battery 30 may have solid electrolyte particles 36 incorporated or embedded therein. The solid electrolyte particles 36 may be the same or similar to the solid electrolyte particles 24 described above. The incorporation of the SE particles 36 into the electrode 32 may be in addition to, or instead of, the use of the electrolyte 18 suspension described above having a liquid electrolyte 22 and SE particles 24. Accordingly, in the embodiment shown in FIG. 2, the liquid electrolyte 34 may or may not include solid electrolyte particles. In embodiments where a hybrid electrolyte is used and solid electrolyte particles 36 are incorporated into the electrode 32, the SE particles in the electrolyte and in the electrode may be the same or they may be different (e.g., in composition and/or size). For example, the SE particles 36 may be larger than the particles 24 (e.g., larger than 100 nm or 1 μm), since they do not have to stay in suspension.

Production of the electrode 32 may include casting slurry onto a current collector 20 and drying the slurry to form an electrode (e.g., anode 12 and/or cathode 14). The slurry may include the solid electrolyte particles 36, along with the active material, electrically conductive material, binder, and/or solvent. The composite slurry may be spread evenly onto the current collector 20 during casting to facilitate a uniform electrode. The electrically conductive material, binder, and active materials may include those described above. Accordingly, by incorporating the solid electrolyte particles 36 into the slurry, the particles may be incorporated into the final, dried electrode. In one embodiment, the SE particles 36 may be randomly dispersed within the electrode 32. The SE particles 36 may occupy gaps or spaces in the electrode that would otherwise form pores in the electrode (e.g., empty space, which may be filled with liquid electrolyte when the battery is assembled). The pores in the electrode may form a randomly interconnected three-dimensional network. In the disclosed electrode 32, the SE particles 36 may fill, or at least partially fill, the pores of the electrode to form a similar randomly interconnected three-dimensional network. The network may therefore have numerous individual paths that an ion could take from the separator to the current collector.

As described above, the electrode 32 may be a cathode and/or an anode. Once the electrodes and other components of the battery 30 are fabricated and assembled, liquid electrolyte 34 may be added to the cell assembly prior to a cell sealing operation. The liquid electrolyte 34 may or may not include SE particles 24 suspended therein. In the embodiment shown in FIG. 2, the liquid electrolyte 34 does not include SE particles 24. In the schematic of FIG. 2, therefore, the SE particles 36 are shown embedded/incorporated into the electrode 32 (FIG. 2 is schematic and not meant to be to scale). The liquid electrolyte 34 fills the remaining gaps, voids, and pores within the electrode 32, and may contact the solid electrolyte particles 36.

In addition to incorporating solid electrolyte particles into the liquid electrolyte and/or the electrode, solid electrolyte particles 40 may be incorporated into the separator 38. The embodiment shown in FIG. 2 includes the previously described electrode 32 including incorporated SE particles 36 and also a separator 38 including incorporated SE particles 40. However, any combination of liquid electrolyte with SE particles, electrodes with SE particles, and a separator with SE particles may be used (e.g., all three, liquid+SE, electrode+SE, or separator+SE). The solid electrolyte particles 40 may be the same or similar to the solid electrolyte particles 24 or solid electrolyte particles 36, described above. However, the SE particles 40 may be different, for example, in size or composition. For example, the SE particles 40 may be different in size depending on the pore dimensions in the separator and electrode. In addition, based on the compatibility of electrode material and separator, SE particles with different composition may be possible. If a slurry of SE particles are added after the electrode is formed and dried, the SE particles may segregate due to settling or by progressive filtration of the SE particles by the restrictions imposed by the pores as the slurry permeates into the electrode. For example, smaller SE particles may be able to penetrate deeply into the electrode, but large particles may be prevented from permeating into the interior of the electrode. Accordingly, depending on the incorporation method, there may be a gradient of SE particle size from one surface to the other (e.g., from the separator side to the current collector side of the electrode). The gradient may be in either direction—decreasing from either the separator side or the current collector side.

The separator 38 may be formed of any suitable ionically conductive, electrically insulating material. In one embodiment, the separator 38 may be a polymer separator, for example, a polyolefin separator (e.g., polyethylene or polypropylene). In another embodiment, the separator 38 may consist of or consist essentially of only a polymer and the SE particles 40. The solid electrolyte particles 40 may be incorporated into the separator 38 using any suitable method. The preparation method could use either a dry or wet (e.g., dispersion in a solvent) process. For example, in one embodiment a separator 38 incorporated with particles 40 may be prepared using a wet process involving slurry casting. Slurry may be prepared by dissolving polymer in a solvent followed by the addition of SE particles. The slurry can then be cast into a free standing membrane or it can be casted directly on top of the electrodes to form a sandwich of layers. In another embodiment, separators may be prepared using a dry process. In this process, polymer and solid electrolyte may be mixed in a dry condition. This mixture may then be extruded, annealed, and stretched.

As described above, the battery 10 may include various combinations of liquid and solid electrolytes including suspensions and/or embedded particles within one or more battery components. The solid electrolyte may displace or replace at least a portion of the liquid electrolyte that would otherwise be used. Accordingly, there may be a total electrolyte content that is comprised or consists of the total liquid electrolyte and the total solid electrolyte (e.g., particles in suspension and/or embedded in the electrodes or separator). A ratio of total solid to total liquid electrolyte within the total electrolyte content may be defined to describe the replacement of liquid electrolyte with solid electrolyte (e.g., particles). In at least one embodiment, the ratio of solid to liquid electrolyte within the total electrolyte content may be at least 1:9 (e.g., at least 10%) by volume, for example, at least 1:7, 1:5, 1:4, 1:3, 1:2, or 1:1 (e.g., at least 50%) by volume. In some embodiments, the total solid electrolyte may exceed the total liquid electrolyte, such as a ratio of at least 3:2, 2:1, or 3:1. For example, if particles in the suspension comprise 20% of the total electrolyte and particles in the anode, cathode, and/or separator comprise another 20% of the total electrolyte, the ratio of solid to liquid electrolyte may be 2:3 (e.g., 40% solid and 60% liquid).

Figure 3:
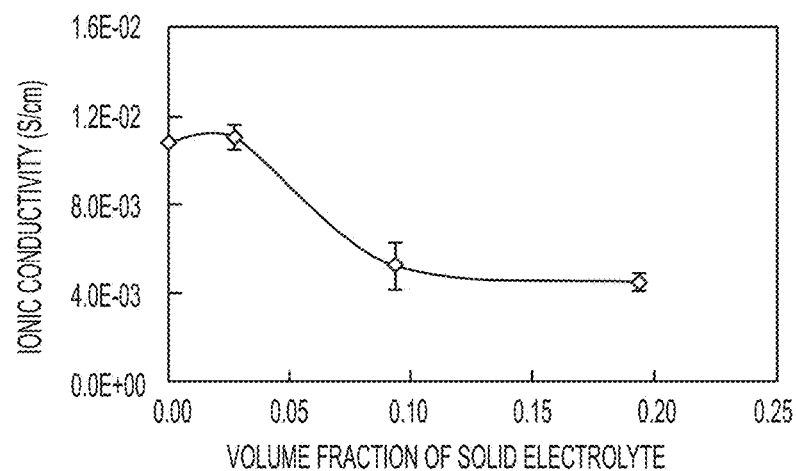
FIG. 3 is example experimental data of ionic conductivity as a function of volume % solid electrolyte.

In one example, a hybrid electrolyte was formed using lithium lanthanum zirconium oxide (LLZO) as a solid electrolyte in combination with a liquid electrolyte containing 1M $LiPF_6$ dissolved in a mixture of ethylene carbonate (EC) and dimethyl carbonate (DMC) solvents. LLZO particles were synthesized using a solid state synthesis method. The particles were added to the liquid electrolyte with varying solid loadings. The ionic conductivity of the hybrid mixture was measured using standard electrochemical techniques. The hybrid electrolyte was placed in a modified flat cell with SS blocking electrodes. Impedance spectroscopy was used to determine the bulk ionic conductivity of the mixture. The ionic conductivity values were calculated with varying solid loading, the results of which are shown in FIG. 3. As shown, the ionic conductivity values remain steady at low weight percent SE and then decrease as the solid electrolyte loading increases to greater levels. However, this decrease in conductivity may be expected because the ionic conductivity of LLZO solid electrolyte particles used ($3.5 \times 10^{-4}$ S/cm) is about two orders-of-magnitude less than that of the liquid electrolyte ($1.1 \times 10^{-2}$ S/cm). Accordingly, even at 20 v/v % solid electrolyte, the overall ionic conductivity remained well within an order of magnitude of a pure liquid electrolyte, despite the much lower ionic conductivity of the solid electrolyte. If the solid electrolytes particles had a higher ionic conductivity, or a similar conductivity to liquid phase, then the resulting hybrid electrolyte mixture would maintain a conductivity that is less affected, or unaffected, by the addition of the solid phase. Despite the slight reduction of conductivity of the mixture in the example given with increasing solid loading, the results nonetheless indicate that a significant amount of liquid electrolyte can be replaced with solid electrolytes without a dramatic loss in performance.

Figure 4:
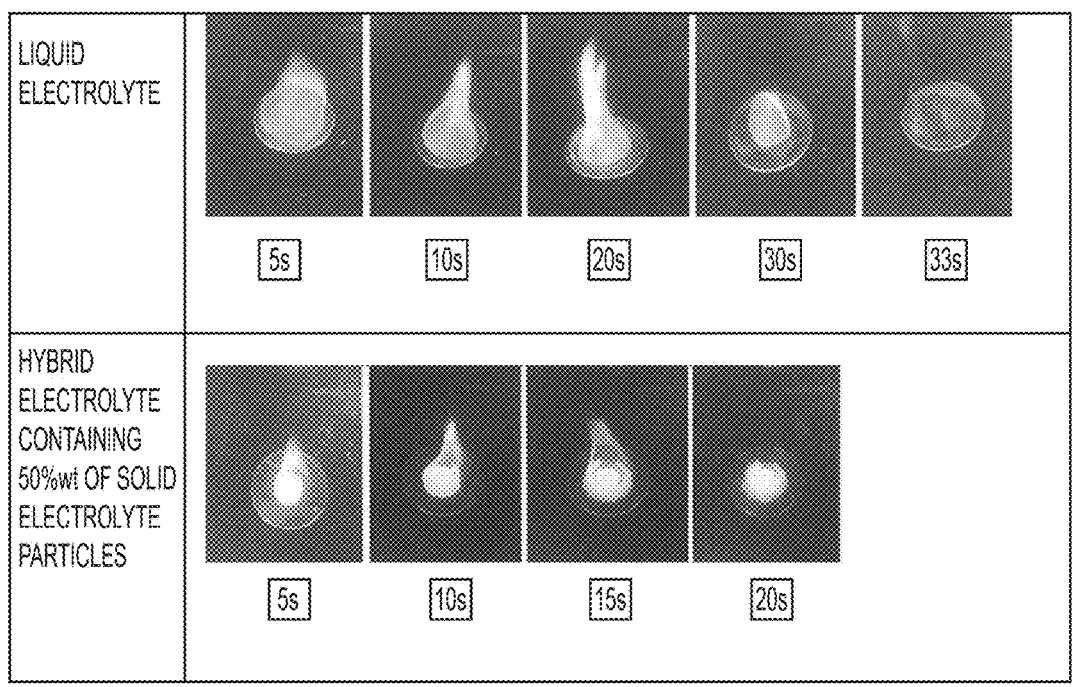
FIG. 4 is a time-lapse of photographs during a flammability test comparing a liquid-only electrolyte and an embodiment of a hybrid solid and liquid electrolyte.

With reference to FIG. 4, data indicating decreased flammability of the disclosed hybrid electrolyte is shown. In flammability tests, 0.5 g of electrolyte was placed on a watch glass and ignited. Once the electrolyte caught fire, the time required for the flame to self-extinguish (the self-extinguish time, SET) was recorded. This was then normalized against the electrolyte weight, to give the specific flammability in units of s/g. The results in FIG. 4 and Table 1, below, clearly show that the addition of solid electrolyte particles significantly reduced the specific flammability. The sequence of images in FIG. 4 show that the liquid-only electrolyte was still burning after 30 seconds, while the hybrid electrolyte containing 50% in weight of solid electrolyte extinguishes within 20 seconds.

TABLE 1

| Performance | Liquid Electrolyte | Hybrid Electrolyte |
| --- | --- | --- |
| Sample Weight | 0.5 g | 0.5 g |
| SET | 33 s | 20 s |
| Specific Flammability | 66 s/g | 40 s/g |

In addition to reducing the amount of potentially flammable liquid electrolyte and/or replacing it with a non-flammable component, there are additional, unexpected benefits provided by the disclosed approaches. First, the solid electrolyte particles may reduce the overall physical porosity of the electrodes and provide a more tortuous pathway for migration of liquid electrolyte within the pores of the electrodes. This may impede the transport of liquid electrolyte to reaction sites, which may prevent or prolong the time to a "thermal runaway" condition. However, because ionic transport is supported and facilitated by the solid electrolyte particles, the tortuosity of the ionic conduction is not increased. Therefore, the tortuous pathway may only affect the liquid electrolyte transport and not the ionic conduction pathway. Another benefit may be that the added particles of solid electrolyte will generally have a higher heat capacity than the liquid electrolyte. Accordingly, the solid electrolyte particles may absorb more heat for a given temperature rise, or conversely, reduce the temperature rise for a given amount heat released. Again, this may slow the approach to a thermal runaway situation, and also without having an adverse effect on ionic conduction.

The benefits of the disclosed hybrids of liquid and solid electrolytes are not limited to just improvements in safety. The use of a hybrid electrolyte in Li-ion cells may also improve charge/discharge rates, energy density, and costs. For example, the low transference number in liquid electrolytes (generally ~0.3) is one of the main reasons for a low utilization of active materials in electrodes, especially in scenarios involving either thicker electrodes or higher charge or discharge rates. In thicker electrodes, the mass transport limitations of lithium ions in the liquid electrolyte phase may become a dominant factor that may reduce the available capacity due to high overpotential upon charging and discharging at fixed voltage limits. Electrolytes with a higher transference number may have better electrode utilization and rates than with electrolytes with a lower transference number.

The disclosed hybrid electrolyte may have a better transference number than a liquid-only electrolyte due to the presence of solid electrolytes, whose transference number is typically higher than that of liquid electrolytes. For example, the transference number of solid electrolytes may be about 1.0, or over 3× that of the liquid phase. Due to this higher transference number in the hybrid electrolyte, improved utilization of the electrode materials at higher rates may be possible. Alternatively, the higher transference may enable cells based on thicker electrodes (e.g., >300 μm). Thicker electrodes may obtain high energy density because they have a higher ratio of the electrode active material to the non-active components, such as the current collectors.

Accordingly, batteries are disclosed including hybrid liquid and solid electrolytes. Solid electrolytes may be incorporated into a liquid electrolyte as a suspension, into the electrodes, and/or into the separator. The solid electrolyte may replace a portion of the liquid electrolyte, which may reduce the likelihood of a reaction between the liquid electrolyte and the active materials. This reduction in the susceptibility to reactions may be obtained with little or no compromise in cell performance. In addition to potentially improving safety margins, other benefits may stem from the hybrid electrolyte, such as increased transference numbers.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A lithium-ion battery comprising:
an anode and cathode including active material;
an ionically conductive separator between the anode and cathode; and
an electrolyte suspension infiltrating the anode, cathode, and separator during discharge and charge, and including an electrolyte and ionically conductive non-active material solid particles that are configured to reduce, per unit weight, a flammability of the electrolyte suspension relative to the electrolyte.

2. The battery of claim 1, wherein the electrolyte suspension includes from 5 to 95 vol. % particles and the balance electrolyte.

3. The battery of claim 1, wherein the electrolyte suspension includes from 20 to 95 vol. % particles and the balance electrolyte.

4. The battery of claim 1, wherein the particles include one or more of lithium lanthanum zirconium oxide (LLZO), lithium lanthanum titanates (LLTO), NASICON type electrolytes, LISICON type electrolytes, thio-LISICON, lithium phosphorous oxynitride, or sulfide glass type electrolytes.

5. The battery of claim 1, wherein the active material includes one or more of graphite, hard carbon, soft carbon, Si/Sn-enriched graphite, lithium titanate oxide, silicon, silicon composite, lithium metal, nickel oxide, lithium nickel cobalt aluminum oxide, lithium nickel manganese cobalt oxide, lithium manganese spinel oxide, lithium iron phosphate or derivatives thereof, lithium mixed metal phosphate, sulfur or sulfur-based materials, or carbon based cathodes.

6. The battery of claim 1, wherein the electrolyte includes an organic solvent and a lithium salt.

7. A rechargeable battery comprising:
an anode and cathode including active material;
an ionically conductive separator between the anode and cathode;
an electrolyte infiltrating the anode, cathode, and separator during discharge and charge; and
ionically conductive non-active material solid electrolyte particles dispersed and embedded within a bulk of at least one of the anode or cathode and configured to reduce, per unit weight, a flammability of the electrolyte.

8. The battery of claim 7, wherein at least a portion of the particles are arranged in an interconnected three-dimensional network.

9. The battery of claim 7, wherein the particles are dispersed and embedded within the bulk of the anode and the cathode.

10. The battery of claim 7 further comprising
ionically conductive non-active material solid electrolyte particles dispersed and embedded within a bulk of the ionically conductive separator and configured to reduce, per unit weight, a flammability of the electrolyte.

11. The battery of claim 7, wherein an average particle size of the particles increases from one side of the anode or cathode to an opposite side.

12. A rechargeable battery comprising:
an anode and cathode including active material;
an ionically conductive separator between the anode and cathode;
an electrolyte suspension infiltrating the anode, cathode, and separator during discharge and charge, and including an electrolyte and first ionically conductive non-active material solid electrolyte particles; and
second ionically conductive non-active material solid electrolyte particles dispersed and embedded within a bulk of at least one of the anode, the cathode, or the separator;
wherein the first and second particles are configured to reduce, per unit weight, a flammability of the electrolyte suspension relative to the electrolyte.

13. The battery of claim 12 wherein the first and the second particles have a different size and/or composition.

14. The battery of claim 12, wherein the battery has a total electrolyte content and a volume ratio of particles to electrolyte is at least 1:4.

15. The battery of claim 14, wherein the volume ratio of particles to electrolyte is at least 1:2.

16. The battery of claim 12, wherein each of the anode, the cathode, and the separator has the second particles dispersed and embedded within a bulk thereof.

17. The battery of claim 12, wherein the electrolyte includes an organic solvent and a lithium salt.

18. The battery of claim 7, wherein the electrolyte includes an organic solvent and a lithium salt.

* * * * *